United States Patent [19]

Petcavich

[11] 4,456,638
[45] Jun. 26, 1984

[54] POLYMER PACKAGING MATERIAL FOR LIQUID CRYSTAL CELL

[75] Inventor: Robert J. Petcavich, Dallas, Tex.

[73] Assignee: Polytronix, Inc., Richardson, Tex.

[21] Appl. No.: 547,771

[22] Filed: Nov. 1, 1983

Related U.S. Application Data

[63] Continuation of Ser. No. 251,483, Apr. 6, 1981, abandoned.

[51] Int. Cl.³ .............................................. C09K 3/34
[52] U.S. Cl. ........................................................ 428/1
[58] Field of Search ........................................... 428/1

[56] References Cited

U.S. PATENT DOCUMENTS

| | | | |
|---|---|---|---|
| 3,600,060 | 8/1971 | Kettering | 350/160 |
| 3,866,313 | 2/1975 | Yih | 29/592 |
| 3,912,366 | 10/1975 | Sprokel | 350/160 LC |
| 3,939,556 | 2/1976 | Borel | 29/592 |
| 3,990,781 | 11/1976 | Gum | 350/160 LC |
| 3,990,782 | 11/1976 | Yamasaki | 350/160 LC |
| 4,007,077 | 2/1977 | Yaguchi | 156/145 |
| 4,026,103 | 5/1977 | Ichikawa | 58/50 R |
| 4,038,439 | 7/1977 | Gibson | 427/38 |
| 4,064,872 | 12/1977 | Caplan | 128/2 H |
| 4,068,923 | 1/1978 | Toida | 350/160 LC |
| 4,101,207 | 2/1978 | Taylor | 350/344 |
| 4,228,574 | 10/1980 | Culley | 29/25.13 |

*Primary Examiner*—Marion McCamish
*Attorney, Agent, or Firm*—Dennis T. Griggs

[57] ABSTRACT

A twisted nematic liquid crystal material is sandwiched between two electrode carrying polymer film or sheet substrates in a liquid crystal display assembly. The substrate material preferably is a semi-crystalline aromatic heterochain polymer characterized by a glass transition point ($T_g$) of at least 90° C. and devoid of secondary transitions in the −50° C. to +80° C. range. The crystallinity of the polymer material is controlled so that the crystallite size in the polymer material is substantially smaller than the wave length of visible light (350–750 micrometers). In a preferred embodiment, an optically isotropic top substrate is formed by a sheet of amorphous cast thermosetting acrylic resin and the lower substrate is formed by a flexible sheet of semi-crystalline aromatic heterochain polymer.

12 Claims, 1 Drawing Figure

U.S. Patent  Jun. 26, 1984  4,456,638
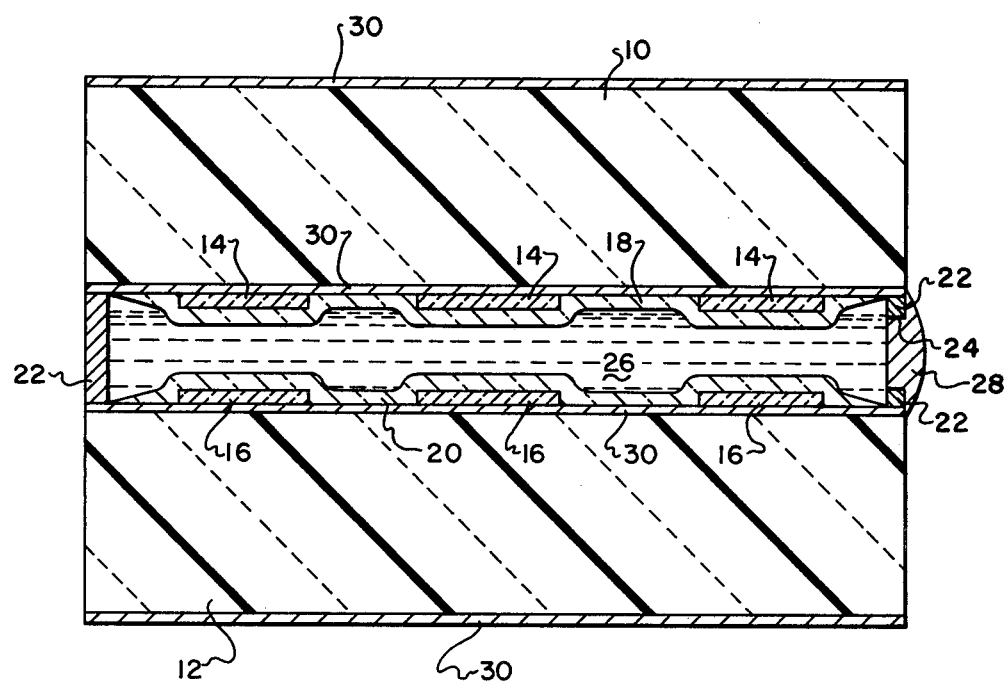

POLYMER PACKAGING MATERIAL FOR LIQUID CRYSTAL CELL

This is a continuation of Ser. No. 251,483, filed on Apr. 6, 1981, now abandoned.

BACKGROUND OF THE INVENTION

1. Field of the Invention

This invention relates to electro-optical display devices of the type utilizing a thin layer of nematic or smectic mesomorphic liquid crystal composition, and in particular to packaging structures for such devices in which optically transparent polymer film or sheet substrates are utilized.

2. Description of the Prior Art

Liquid crystal display (LCD) devices utilize a liquid crystal material sandwiched between two substrates. Electrodes carried on the substrates are selectively energized by an electrical potential with the result that a turbulent flow of liquid crystal molecules occurs (light scattering type) or the molecules are oriented in a new direction (field effect type) such that the areas of the liquid crystal fluid which are subjected to the electrical field are observed to be lighter or darker than the background areas, when viewed in polarized light. The display devices are either reflective, in which case the back substrate is reflective and the front substrate is transparent, or transmissive in which case both substrates are transparent and the device is back lighted.

Only two major categories of liquid crystal materials are currently being used in LCD devices, one being the "nematic" state and the other being the "smectic" state. The smectic state is characterized as the most highly ordered state of liquid crystals. Materials of this type, however, do not exhibit many of the useful optical properties characteristic of the nematic state. Specifically, they do not exhibit "dynamic scattering" in response to an electric field. On the other hand, smectic materials are desirable in that they exhibit a very low crystal-to-mesomorphic transition temperature and often exist in the mesomorphic state at room temperatures.

Nematic liquid crystal materials frequently assume the characteristics of a thread-like texture when a thin section of the material is viewed between crossed polarizers. Nematic liquid crystals are normally transparent to light. However, when electric potential is imposed across the nematic liquid crystal layer, it causes the crystals to scatter light. This effect has been termed "dynamic scattering". The dynamic scattering effect of nematic liquid crystals in response to a voltage applied across the crystal is useful in many electro-optic devices such as alpha-numeric displays.

Conventional nematic liquid crystal materials exhibit the nematic mesophase generally at relatively high temperatures, and thus require external environmental control apparatus to maintain the material in a nematic mesophase. Further, the temperature range of the mesophase is generally very narrow, requiring that the temperature be accurately maintained. Lyotropic nematic liquid crystals have a relatively low crystal-to-mesomorphic transition temperature and are commonly used in the place of conventional thermotropic nematic liquid crystals.

Recently, several improvements have been made in liquid crystal display systems to improve their efficiency and operability. One such improvement is the use of twisted nematic liquid crystal composition sandwiched between optically transmissive plates. The internal surfaces of the plates that contain the liquid crystal composition, with the electrodes affixed thereto, can be conveniently prepared by unidirectionally rubbing the surfaces prior to assembling the device. By unidirectionally rubbing the internal surfaces of the plates, with the electrodes affixed thereto, and mounting the opposing plates with the axes of the rubbed surfaces being at ninety degree angles, the liquid crystal material will align itself in a twisted path that twists through a ninety degree angle between the surfaces. Thus, light will be rotated in a ninety degree angle as it passes through the twisted nematic liquid crystal composition from one surface of the cell to the other surface. Application of an electric field between the selected electrodes of the cell causes the twist of the nematic crystal composition to be temporarily removed in the portion of the cell between the selected electrodes.

By mounting an optical polarizer on the outside of the cell walls, parallel to the rub direction, polarized light can be passed through the wall of the cell and the polarized light will be rotated as it passes through the twisted liquid crystal composition. In such a liquid crystal cell, where the surfaces of the cell have been unidirectionally rubbed and mounted at ninety degree angles to each other, the polarized light will be rotated ninety degrees as it passes through the twisted liquid crystal composition. A second polarizer mounted on the outside of the second cell wall at ninety degrees to the first polarizer will allow the polarized light beam to pass through the second polarizer and be reflected by suitable reflector means mounted behind the second polarizer. The polarized light will then be reflected back into the liquid crystal material and will be twisted through ninety degrees as it is transmitted back through the internal portion of the liquid crystal cell and will exit through the first optical polarizer.

The characteristics of the substrate and/or electrode surfaces which are in intimate contact with the liquid crystal material can affect the orientation direction bias of tilting of the crystal in those areas. This is especially true with glass substrates for reasons that are unknown at this time. Also, in the reflective mode a nonconducting surface is needed upon which to form the electrode pattern which limits the choice of suitable substrates. Usually glass substrates having polarizers with backside mirror coatings are employed. The quality of the display is a function of the contrast between the electrically activated area and the background area.

Conventional liquid crystal display devices utilize glass as the substrate material. Fabrication of liquid crystal displays made from glass, in guage thicknesses less than 20 mils, is difficult because of the fragile nature of glass. When glass is used as a substrate, it must be protected in the electronic device by an unbreakable, transparent plastic window, which adds to the device cost. Moreover, the use of glass and the clear plastic window reduces the effective viewing angle because of the combined thickness of the layers. In an LCD, it is important to reduce the distance between the rear reflective polarizer and the liquid crystal layer to reduce the parallax between the "on" segment and the shadow of the "on" segment, thereby resulting in a wider viewing angle. The difference in refractive index of the liquid crystal material and glass substrates add another effect known as a "floating image" in conventional glass displays.

The development of large area liquid crystal display devices has been limited because the effective viewing angle diminishes directly in proportion to the thickness of the glass substrate. Moreover, glass contains ionic contamination, for example sodium ions, which corrupts the liquid crystal material causing increased battery power drain.

Optically clear polymer film such as mylar, polyethylene, triphtalate, poly-carbonate, poly vinyl chloride, cellulose triacetate, cellulose acetate, and cellulose butyrate have been proposed for use as substrates for encapsulating the liquid crystal material, for example, as shown in Culley et al U.S. Pat. No. 4,228,574. However, such materials, for example cellulose acetate and cellulose butarate, are chemically unstable, and are attacked by most organic solvents, acids and bases. Attempts to use such materials have failed because of their unstable nature in the presence of the liquid crystal material, and because of their incompatibility with environmental conditions such as temperature and humidity variations.

SUMMARY OF THE INVENTION

After careful testing, it has been determined that a polymer material which is suitable for use as a plastic substrate in a twisted nematic liquid crystal display should possess a very unique set of properties relating to glass transition point ($T_g$) and melting point ($T_m$), coefficient of thermal expansion, chemical resistance, environmental stability, optical properties and crystallinity.

The ambient operating conditions for a twisted nematic liquid crystal display device may range from $-50°$ C. to $80°$ C. A plastic substrate material which is to be used in this temperature range must have a glass transition point ($T_g$) and/or melting point ($T_m$) of at least $80°$ C. or higher and the plastic material should not have any secondary transition in the $-50°$ to $80°$ temperature range. To meet this restriction, the polymer used in the film should contain some saturated or unsaturated cyclic chemical group such as an organic ring structure selected from the group comprising benzene, cyclohexane or bicyclic moieties such as 2,5 norbornadiene to stiffen the polymer chain and thereby increase the ($T_g$) of the material.

The coefficient of thermal expansion of film or sheet can be controlled in the following manner. First by adjusting the amount of crystallinity which will depend on processing temperatures and draw or extrusion directions and second, varying the draw ratio of the film or sheet as it is extruded or molded so that the internal stresses induced during fabrication are minimized.

Chemical resistance is improved by several methods. First, by choosing a polymer chemical structure so that liquid crystal material and processing chemicals (acids, bases, organic solvents) do not attack the plastic, and second, by controlling the crystallinity which is accomplished during processing or post-processing annealing and third, by applying a protective thermosetting silicone, epoxy, or urethane overcoat to render the polymer film or sheet chemically resistant.

Environmental stability is determined by a number of factors, for example, ultraviolet stability is provided by incorporating an ultraviolet absorber such as hydroquinone into the plastic and moisture resistance is accomplished by using a polymer substrate having hydrophobic properties.

It is generally desirable that in displays which utilize twisted nematic liquid crystals, that the substrate have little or no color when observed between crossed or parallel polarizing materials at normal viewing angles, e.g. no greater than 45° off axis. This requirement is satisfied by fabricating the substrates with a film or sheet material containing chemical repeating units which are not readily polarized by light (i.e. must not contain significant amounts of carbon-carbon double bonds), or by using an amorphous plastic material.

If a polymer is selected which does not have a repeating unit in which a highly polarizable moiety does exist, the polymer chain must be oriented by the draw ratio in such a way to prevent excessive interaction of light with the polymer material at normal viewing angles.

Another constraint relating to optical properties arises due to crystallinity. If the crystallite size in the polymer film or sheet is on the order of the wave length of visible light, i.e. 350-750 micrometers, it will interfere with the incoming light and be defracted. Depending on the amount, type and size of crystallites present in the polymer film or sheet, a wide range of colors will be observed when viewed between crossed or parallel polarizers. The problem can be significantly reduced by controlling the crystallite size so that the size of an individual crystal is much smaller than the wave length of visible light. Crystallinity can be varied by controlling the microstructure of the polymer chains, the amount of short and long chain branching, and processing conditions.

According to the present invention, a liquid crystal display using a polymer film or sheet substrate which satisfies the foregoing constraints includes a layer of polarizer material, an aromatic heterochain polymer substrate, a transparent conductor such as indium tin oxide, alignment materials such as polyvinyl alcohol, liquid crystal material such as biphenyl ester or nitrile, spacer materials such as glass, polymer fiber or ceramic beads, and organic sealant material, such as epoxy, to contain the liquid crystal and a transflector or reflector. The polarizer layers are preferably made of an aromatic heterochain polymer film which has been converted into a lamination.

An LCD package utilizing the foregoing materials is preferably fabricated by a batch plate-to-plate process. Displays made from such a process can be used in applications such as time pieces, calculators, electronic equipment, appliances, automobile indicators, motorcycles, aircraft, games, or any application where information is processed by a computer or microprocessor and displayed in alpha-numeric format.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

The sole FIGURE of the drawing is a sectional view of a nematic liquid crystal cell constructed according to the teachings of the invention.

DETAILED DESCRIPTION OF THE PREFERRED EMBODIMENT

The terms "sheet" and "film", as discussed in this invention, are defined as follows:
 1. "sheet" is of a thickness of 10 thousandths of an inch or greater, and 2. "film" being of a thickness less than 10 thousandths of an inch.

The FIGURE illustrates the preferred embodiment of the invention. It comprises upper and lower plates or substrates 10, 12 which can range in thickness from four to eighty mils. The substrates 10, 12 are preferably made from cast thermoset acrylic polymer resin. Onto the surface of the upper plastic plate 10 is deposited a transparent conductor 14 such as indium tin oxide which has a resistivity of 100 to 1,000 ohms per square. A transparent conductor 16, such as indium tin oxide, is likewise deposited onto the surface of the lower plastic plate 12. The transparent conductors 14, 16 are patterned to form an alpha-numeric segment array by conventional photolithographic techniques well known in the art. Covering the electrode patterns are thin polymeric alignment layers 18, 20, such as polyimide or polyvinyl alcohol, which function as an insulator for the electrodes and as an alignment layer for the liquid crystal material.

The plastic plates 10, 12 are then oriented so that the surfaces having the electrode patterns are facing and aligned with each other. The substrates 10, 12 are maintained in spaced apart relation by suitable spacing means, for example by ceramic beads or by an annular spacing ring (not illustrated). An adhesive ring 22 is then applied to one substrate surface, the two halves assembled, and then vacuum filled through a capillary fill opening 24 with liquid crystal material 26. The fill hole 24 is then closed by an adhesive plug 28 which will not react with the liquid crystal material 26 and protects the liquid crystal material from environmental hazards.

The exterior surfaces of the substrates 10, 12 are preferably protected by a coating 30 of thermosetting silicone, epoxy or urethane to render the substrates resistant to chemical attack and abrasion.

The device will be functional as described, but, in order to observe the light scattering effect when the liquid crystal is exposed to an electric field, the device should incorporate polarizers so that the optical axes of the front and rear polarizers are oriented 90° to one another. It is preferrable that the rear polarizer have a reflector or transflector backing for lighting purposes. The polarizer layers preferably comprise a lamination of heterochain polymer film.

The polymers which can be used in the foregoing construction can be amorphous (non-crystalline) or semicrystalline with the following preferred properties:

(1) A glass transition point and/or melting point of 80° C. or higher with no secondary transitions between −50° C. and +80° C. to allow device operation and storage without material failure under ambient atmospheric conditions. This can be accomplished by (a) incorporating saturated or unsaturated cyclic structures into the polymer chain such as an organic ring structure selected from the group comprising benzene, cyclohexane or bicyclic moieties such as 2,5 norbornadiene (b) by adjusting the polymer chain microstructure isotactic, atactic, or syndiotactic placements of the monomer repeating units, or (c) by adjusting the amount of crystallinity to 20% or more, with the remaining structure being amorphous.

(2) The coefficient of thermal expansion of the polymer film or sheet is minimized or matched with the electrode material, alignment layer and sealing adhesives so that the LCD device does not delaminate during thermal cycling.

(3) Resistance to processing chemicals and liquid crystal is achieved by using inert plastics such as thermosets, adjusting the crystallinity to twenty percent (20%) or more, or by using a chemically resistant thermosettng silicone, epoxy, or urethane overcoat on the plastic.

(4) Environmental stability to ultraviolet radiation is accomplished by incorporating an ultraviolet stabilizer such as hydroquinone into the polymer substrate or by using a polymer which does not interact with ultraviolet radiation such as polydiorganosiloxane. Water resistance is provided by employing a hydrophobic polymer such as a polyolefin or by using a polymer film with a high degree of crystallinity.

(5) Good optical properties are obtained by using a plastic substrate which is isotropic such as cast acrylic or by using a polymer film or sheet where the chemical repeating units do not interact with visible light (i.e. one that does not contain significant amounts of carbon-carbon, carbon-oxygen, carbon sulfur, or sulfur oxygen double bonds.

The polymers are preferable transparent but may be colored if a display is required where color may be of advantage to the observer as in a bar graph application. Preferred polymers are polyacrylonitrile, acrylonitrile-butadiene-styrene polymers, cellulose propionate, ethyl cellulose, poly(ethylene-co-chlorotrifluoroethylene), poly(ethylene-co-tetrafluoroethylene), fluorinated poly(ethylene-co-propylene), poly(chlorotrifluoroethylene), poly(tetrafluoroethylene), poly(vinyl fluoride) poly(vinylidene fluoride), poly(vinylidene chloride-co-vinyl chloride), nylon 6, 11, 12, polyurethanes, polydiorganosiloxanes, cast and molded thermoset acrylic, poly(methylmethacrylate), poly(2,2-bis 4' phenylene propane carbonate), poly(ethyleneglycol-co-dimethyl-terephthalate), poly-4-methyl-pent-1-ene, polyolefins, poly(phenylenesulfide), poly(sulfone), poly(ethersulfone), polyimide, and poly(oxyethyleneoxyterephthaloyl), such as monaxially oriented PETRA HTB (Allied Chemical).

Although a preferred embodiment of the invention has been described in detail, it should be understood that various changes, substitutions and alterations can be made therein without departing from the spirit and scope of the invention as defined by the appended claims.

What is claimed is:

1. In a field effect liquid crystal display cell having liquid crystal material confined between a pair of substrates, at least one of said substrates including an electrode mounted thereon, said at least one substrate being a polymer film or sheet substrate characterized by:
   (1) a glass transition point and melting point of 80° C. or higher with no secondary transitions between −50° C. and +80° C.;
   (2) a coefficient of thermal expansion matched with the electrode coefficient of thermal expansion;
   (3) being an inert plastic having a crystallinity of twenty percent or more;
   (4) having an ultraviolet stabilizer in the substrate;
   (5) having an hydrophobic polymer for water resistance; and
   (6) the chemical repeating units of the substrate being non-interactive with visible light.

2. The field effect liquid crystal display cell of claim 1 wherein the substrate having the glass transition point and melting point of 80° C. or higher with no secondary transitions between −50° C. and +80° C. is provided by adjusting the substrate polymer chain microstructure isotactic, atactic, or syndiotactic placements of the monomer repeating units.

3. The field effect liquid crystal display cell as defined in claim 1, wherein said polymer film or sheet is selected from the group comprising:

polyacrylonitrile, acrylonitrile-butadiene-styrene polymer, cellulose propionate, ethyl cellulose, poly(ethylene-co-chlorotrifluoroethylene), poly(ethylene-co-tetrafluoroethylene), fluorinated poly(ethylene-co-propylene), poly(chlorotrifluorethylene), poly(tetrafluoroethylene), poly(vinyl fluoride), poly(vinylidene fluoride), poly-(vinylidene chloride-co-vinyl chloride), nylon 6, 11, 12, polyrethane, polydiorganosiloxane, cast thermoset acrylic, poly(methylmethacrylate), poly(2,2-bis-4' phenylene propane carbonate), poly(ethyleneglycol-co-dimethylterephthalate), poly-4-methyl-pent-1-ene, polyolefin, poly(phenylenesulfide), poly(sulfone), poly(ethersulfone), polyimide, and poly(oxyethyleneoxyterephthaloyl), and allyl carbonate.

4. In a field effect liquid crystal display cell having liquid crystal material confined between a pair of substrates, and at least one of said substrates including an electrode mounted thereon, said at least one substrate being a polymer film or sheet substrate characterized by:
(1) having a glass transition point and melting point of 80° C. or higher with no secondary transitions between −50° C. and +80° C.;
(2) having a coefficient of thermal expansion matched with the electrode coefficient of thermal expansion;
(3) including a chemically resistant overcoat on the substrate;
(4) having an ultraviolet stabilizer included in the substrate;
(5) incorporating a hydrophobic polymer for water resistance; and
(6) being the chemical repeating units of the substrate non-interactive with visible light.

5. The field effect liquid crystal display cell as defined in claim 4 wherein said overcoat is selected from a group comprising chemical resistant thermosetting silicone, epoxy or urethane.

6. The field effect liquid crystal display cell as defined in claim 4, wherein said polymer film or sheet is selected from the group comprising:

polyacrylonitrile, acrylonitrile-butadiene-styrene polymer, cellulose propionate, ethyl cellulose, poly-(ethylene-co-chlorotrifluoroethylene), poly(ethylene-co-tetrafluoroethylene), fluorinated poly(ethylene-co-propylene), poly(chlorotrifluorethylene), poly(tetrafluoroethylene), poly(vinyl fluoride), poly(vinylidene fluoride), poly-(vinylidene chloride-co-vinyl chloride), nylon 6, 11, 12, polyrethane, polydiorganosiloxane, cast thermoset acrylic, poly(methylmethacrylate), poly(2,2-bis 4' phenylene propane carbonate), poly(ethyleneglycol-co-dimethylterephthalate), poly-4-methyl-pent-1-ene, polyolefin, poly(phenylenesulfide), poly(sulfone), poly(ethersulfone), polyimide, and poly(oxyethyleneoxyterephthaloyl), and allyl carbonate.

7. In a field effect liquid crystal display cell having liquid crystal material confined between a pair of substrates, and at least one of said substrates including an electrode mounted thereon, said at least one substrate being a polymer film or sheet substrate characterized by:
(1) having a glass transition point and melting point of 80° C. or higher with no secondary transitions between −50° C. and +80° C.;
(2) having a coefficient of thermal expansion matched with the electrode coefficient of thermal expansion;
(3) being an inert plastic having a crystallinity of twenty percent or more;
(4) being a polymer that does not interact with ultraviolet radiation;
(5) incorporating a hydrophobic polymer for water resistance; and
(6) having the chemical repeating units of the substrate non-interactive with visible light.

8. The field effect liquid crystal display cell as defined in claim 7, wherein said polymer film or sheet is selected from the group comprising:

polyacrylonitrile, acrylonitrile-butadiene-styrene polymer, cellulose propionate, ethyl cellulose, poly-(ethylene-co-chlorotrifluoroethylene), poly(ethylene-co-tetrafluoroethylene), fluorinated poly-(ethylene-co-propylene), poly(chlorotrifluoroethylene), poly (tetrafluoroethylene), poly(vinyl fluoride), poly(vinylidene fluoride), poly-(vinylidene chloride-co-vinyl chloride), nylon 6, 11, 12, polyrethane, polydiorganosiloxane, cast thermoset acrylic, poly(methylmethacrylate), poly(2,2-bis 4' phenylene propane carbonate), poly(ethyleneglycol-co-dimethylterephthalate), poly-4-methyl-pent-1-ene, polyolefin, poly(phenylenesulfide), poly(sulfone), poly(ethersulfone), polyimide, and poly(oxyethyleneoxyterephthaloyl), and allyl carbonate.

9. In a field effect liquid crystal display cell having twisted nematic liquid crystal material confined between a pair of substrates, and at least one of said substrates including an electrode mounted thereon, said at least one substrate being a polymer film or sheet substrate characterized by:
(1) having a glass transition point and melting point of 80° C. or higher with no secondary transitions between −50° C. and +80° C.;
(2) having a coefficient of thermal expansion matched with the electrode coefficient of thermal expansion;
(3) being an inert plastic having a crystallinity of twenty percent or more;
(4) having an ultraviolet stabilizer included in the substrate;
(5) having a high degree of crystallinity for water resistance; and
(6) having the chemical repeating units of the substrate non-interactive with visible light.

10. The field effect liquid crystal display cell as defined in claim 9, wherein said polymer film or sheet is selected from the group comprising:

polyacrylonitrile, acrylonitrile-butadiene-styrene polymer, cellulose propionate, ethyl cellulose, poly-(ethylene-co-chlorotrifluoroethylene), poly(ethylene-co-tetrafluoroethylene), fluorinated poly-(ethylene-co-propylene), poly(chlorotrifluoroethylene), poly(tetrafluoroethylene), poly(vinyl fluoride), poly(vinylidene fluoride), poly-(vinylidene chloride-co-vinyl chloride), nylon 6, 11, 12, polyrethane, polydiorganosiloxane, cast thermoset acrylic, poly(methylmethacrylate), poly(2,2-bis 4' phenylene propane carbonate), poly(ethyleneglycol-co-dimethylterephthalate), poly-4-methylpent-1-ene, polyolefin, poly(phenylenesulfide), poly(sulfone), poly(ethersulfone), polyimide, and poly(oxyethyleneoxyterephthaloyl), and allyl carbonate.

11. In a field effect liquid crystal display cell having twisted nematic liquid crystal material confined between a pair of substrates, and at least one of said substrates including an electrode mounted thereon, said at least one substrate being a polymer film or sheet substrate characterized by:
  (1) having a glass transition point and melting point of 80° C. or higher with no secondary transitions between −50° C. and +80° C.;
  (2) having a coefficient of thermal expansion matched with the electrode coefficient of thermal expansion;
  (3) being an inert plastic having a crystallinity of twenty percent or more;
  (4) having an ultraviolet stabilizer included in the substrate;
  (5) incorporating a hydrophobic polymer for water resistance; and
  (6) being isotropic.

12. The field effect liquid crystal display cell as defined in claim 11, wherein said polymer film or sheet is selected from the group comprising:
  polyacrylonitrile, acrylonitrile-butadiene-styrene polymer, cellulose propionate, ethyl cellulose, poly(ethylene-co-chlorotrifluoroethylene), poly(ethylene-co-tetrafluoroethylene), fluorinated poly(ethylene-co-propylene), poly(chlorotrifluorethylene), poly(tetrafluoroethylene), poly(vinyl fluoride), poly(vinylidene fluoride), poly-(vinylidene chloride-co-vinyl chloride), nylon 6, 11, 12, polyurethane, polydiorganosiloxane, cast thermoset acrylic, poly(methylmethacrylate), poly(2,2-bis 4' phenylene propane carbonate), poly(ethyleneglycol-co-dimethylterephthalate), poly-4-methylpent-1-ene, polyolefin, poly(phenylenesulfide), poly(sulfone), poly(ethersulfone), polyimide, and poly(oxyethyleneoxyterephthaloyl), and allyl carbonate.

* * * * *